(12) United States Patent  
Kornfeld et al.

(10) Patent No.: US 9,104,293 B1  
(45) Date of Patent: Aug. 11, 2015

(54) USER INTERFACE POINTS OF INTEREST APPROACHES FOR MAPPING APPLICATIONS

(71) Applicant: Amazon Technologies, Inc., Reno, NV (US)

(72) Inventors: Ronald A. Kornfeld, Seattle, WA (US); Michael Christopher Wenneman, Seattle, WA (US); Michael Z. Podwal, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 247 days.

(21) Appl. No.: 13/720,077

(22) Filed: Dec. 19, 2012

(51) Int. Cl.
    *G06F 3/0481* (2013.01)
    *G05B 19/042* (2006.01)
    *G06F 9/44* (2006.01)

(52) U.S. Cl.
    CPC ........ *G06F 3/04817* (2013.01); *G05B 19/0426* (2013.01); *G06F 8/34* (2013.01)

(58) Field of Classification Search
    CPC .... G06F 8/34; G06F 3/04817; G05B 19/0426
    USPC ........................................................ 715/771
    See application file for complete search history.

(56) References Cited

U.S. PATENT DOCUMENTS

| | | | |
|---|---|---|---|
| 8,433,370 B2 * | 4/2013 | Jung .............................. | 455/566 |
| 8,601,380 B2 * | 12/2013 | Vaittinen et al. .............. | 715/757 |
| 8,639,767 B1 * | 1/2014 | Harris et al. .................. | 709/207 |
| 8,761,590 B2 * | 6/2014 | An et al. ......................... | 396/72 |
| 8,762,056 B2 * | 6/2014 | Forstall et al. ................ | 701/519 |
| 8,774,825 B2 * | 7/2014 | Forstall et al. ............. | 455/456.1 |
| 2008/0040678 A1 * | 2/2008 | Crump .......................... | 715/763 |
| 2009/0005021 A1 * | 1/2009 | Forstall et al. ............. | 455/414.3 |
| 2010/0325563 A1 * | 12/2010 | Goldthwaite et al. ........ | 715/757 |
| 2012/0001939 A1 * | 1/2012 | Sandberg ....................... | 345/633 |
| 2012/0044163 A1 * | 2/2012 | Sim et al. ...................... | 345/173 |
| 2012/0075341 A1 * | 3/2012 | Sandberg ....................... | 345/633 |

* cited by examiner

*Primary Examiner* — David Phantana Angkool
(74) *Attorney, Agent, or Firm* — Novak Druce Connolly Bove+Quigg LLP

(57) ABSTRACT

Various embodiments provide a graphical element displayed through a mapping application that visually represents at least one point of interest (POI) data point on a map for a location. In one example, a single multi-dimensional graphical element can identify a location and identity of multiple POIs associated with the same geocode or physical location on a map, such as a multi-tenant building. In this example, each surface of the graphical element may represent a different POI. In another example, a multi-dimensional graphical element can identify a location and information for a single POI. In this example, each surface can represent different information, such as a surface for customer reviews, a surface for store hours, address, or contact information, a surface for a restaurant's menu, a surface for promotions, and the like.

25 Claims, 6 Drawing Sheets

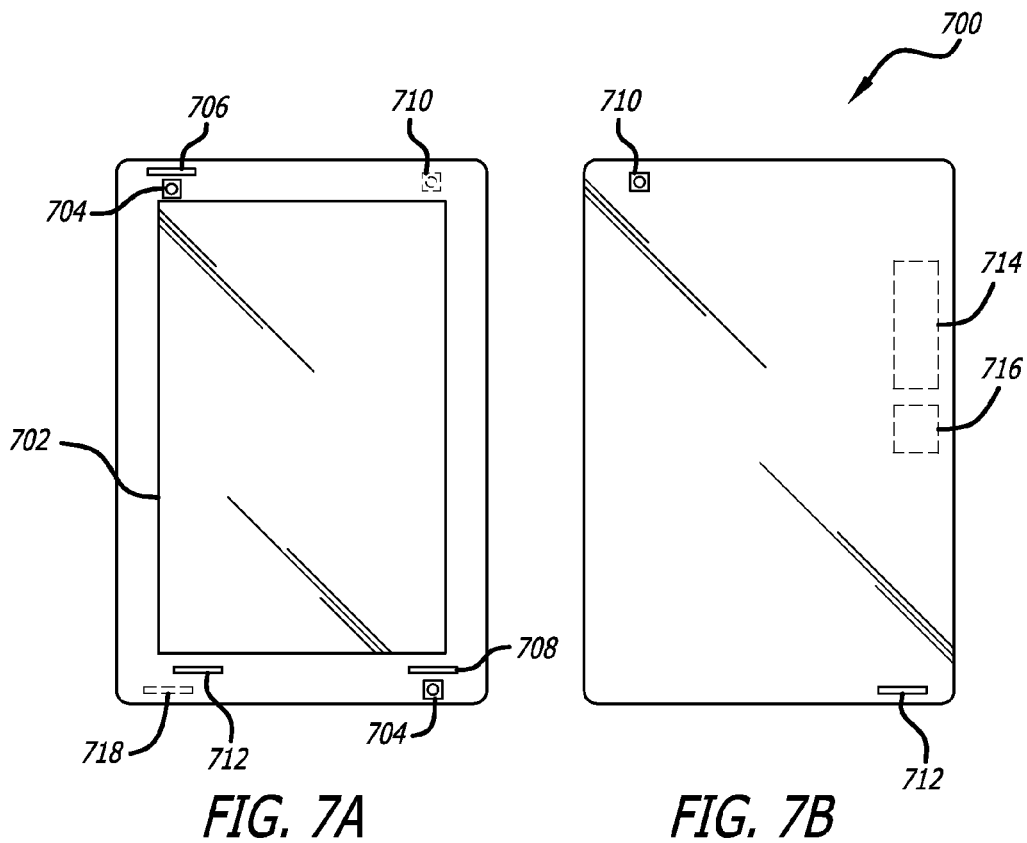
FIG. 7A
FIG. 7B
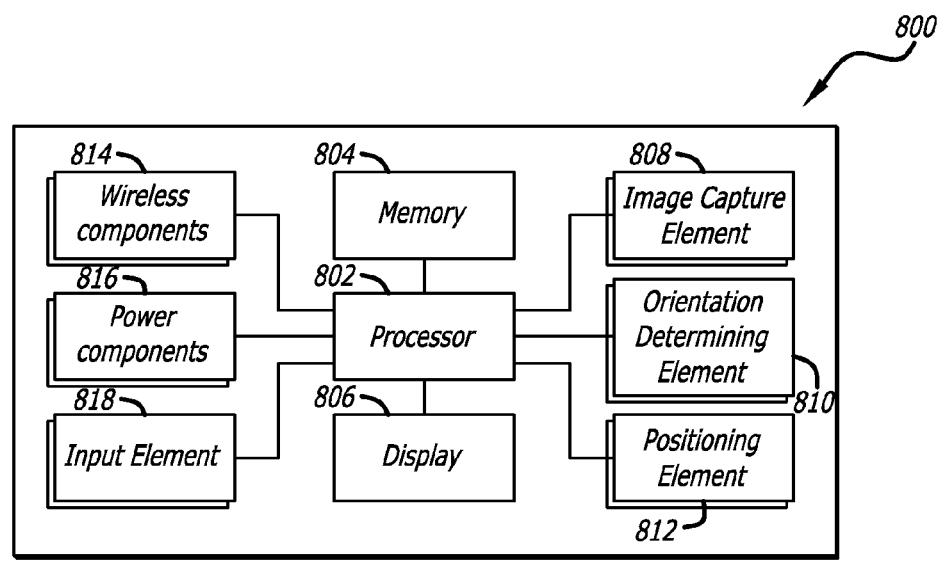
FIG. 8

USER INTERFACE POINTS OF INTEREST APPROACHES FOR MAPPING APPLICATIONS

BACKGROUND

Many people utilize computer-based mapping applications to obtain the locations of, and directions to, various locations, as well as to locate places near a current or specific location. A person wanting to perform such a task typically opens an application, inputs the necessary information (such as a location or point of interest) and receives location information, driving directions, nearby points of interest (POI) as determined by the mapping application provider, and other such information. The user might be interested in specific types of locations or points of interest that the user would like to include with the mapping information, but the point of interest information provided with the mapping application typically is selected by a provider of the mapping application and often relates specifically to businesses, public spaces, government buildings, and other such locations. The POI is not customized for the user, other than the user potentially being able to select subsets of the already-determined POI to obtain on a map. Further, conventional POI databases have been incomplete except for a few high volume/revenue categories (e.g., travel, restaurants, medical). Thus, in the past, the number of complete publishable POI records has been a subset of the total number of points of interest that actually exist. However, this trend is changing through a combination of databases expanding coverage and the creation of new POI models, which has created POI congestion in locations, such as multi-tenant facilities (e.g., office buildings, shopping malls, and the like). Therefore, as technology advances and as more and more POI become available, it can be advantageous to adapt the ways in which POI is presented to users and the ways in which users access the same.

BRIEF DESCRIPTION OF THE DRAWINGS

Various embodiments in accordance with the present disclosure will be described with reference to the drawings, in which:

FIGS. 7A-7B illustrate an example computing device that can be used to implement aspects of various embodiments;

FIG. 8 illustrates example components that can be used with a device such as that illustrated in FIGS. 7A-7B.

DETAILED DESCRIPTION

Figure 1:
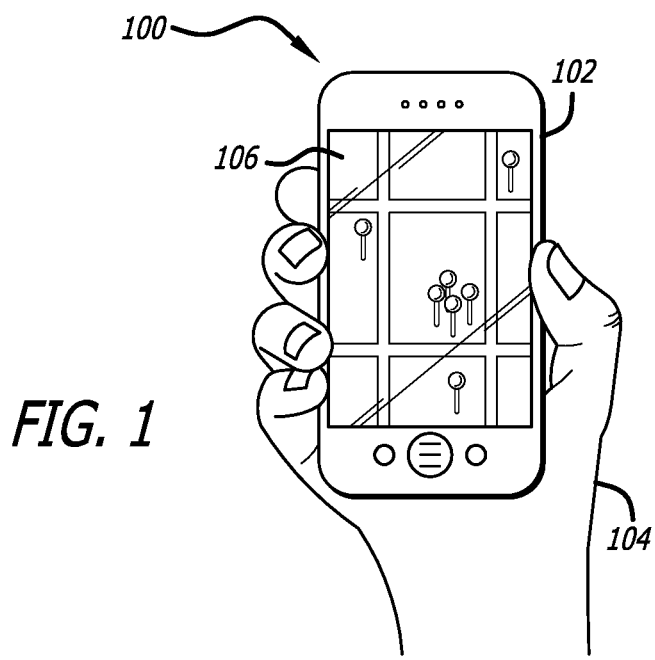
FIG. 1 illustrates an example situation of a user viewing a mapping application on a display of computing device in accordance with at least one embodiment.

Systems and methods in accordance with various embodiments of the present disclosure may overcome one or more of the aforementioned and other deficiencies experienced in conventional approaches to providing mapping information to a user. In particular, various embodiments provide one or more graphical elements displayed through a mapping application that can concurrently and visually represent multiple point of interest (POI) data points on a map for at least one location. In one example, a single multi-dimensional graphical element can identify a location, as well as the identities of multiple POIs associated with the location, physical address, or same geocode on a map, such as a multi-tenant building. In this example, each dimension of the graphical element may represent a different POI. In another example, a multi-dimensional graphical element can identify a location and information for various aspects of a single POI. In this example, each dimension can represent one of these different aspects, such as a dimension for customer reviews, a dimension for store hours, address, or contact information, a dimension for a restaurant's menu, a dimension for promotions, and the like.

In at least one embodiment, a mapping application executing on a computing device receives a request from a user. The map data, such as map tiles, road information, driving directions, and similar such information, to satisfy the request is determined. Based at least in part upon user preference information, as well as a location associated with the map data for the request, POI information related to the location and user preference information is determined. At least a portion of the POI information is selected and provided with the map data for display to the user. A multi-dimensional graphical element, such as a pin, is rendered for the POI information to identify POI for a particular location(s). The multi-dimensional graphical element is selectable and upon selection by the user, a larger view of the multi-dimensional graphical element can be rendered, such as a zoom-in or blown-up version, for enabling the user to engage and manipulate the multi-dimensional graphical element to obtain additional information associated with the POI.

The POI can be selected based at least in part upon information for the user associated with the application. For example, a mapping system or service associated with the application and/or a provider of the application can monitor and obtain information about the user, such as routes the user takes, the types of places a user visits, and other such information, past purchases of the user, information about items the user has viewed or searched, explicit user indications, preference information for the user, or contextual information as determined by one or more sensors of the client device. This information and more can be used to select POIs that are likely to be more relevant to the user. A mapping service can also contact third party services or other data sources that can provide information about the user that can be used to determine POIs that are likely of interest to the user as well.

Various other functions and advantages are described and suggested below as may be provided in accordance with the various embodiments.

Figure 2:
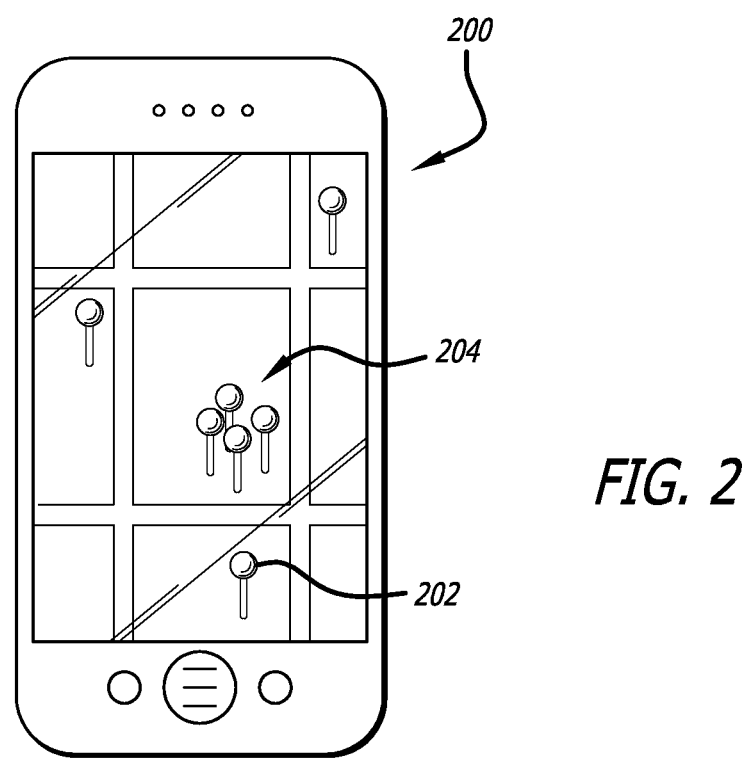
FIG. 2 illustrates a conventional graphical approach for providing a mapping application on a display of a computing device in accordance with at least one embodiment.

FIG. 1 illustrates an example situation 100 of a user 104 viewing a mapping application displayed on a display screen 106 of a computing device 102, in accordance with various embodiments. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, and portable media players, among others. In this example, the mapping application includes multiple pins that identify physical locations on a map. This shown further in FIG. 2, which illustrates a map 200 that includes multiple pins 202 and a cluster of densely populated pins 204. In conventional mapping approaches, pins typically represent physical locations or establishments that have been provided or suggested to a user in response to a search inquiry from the same. This is typically achieved upon the user providing information into a search field, such as a location (address), subject, or business type, and in return receives location information, driving directions, and other such information, conventionally marked on a map as individual pins. Locations or establishments that have been suggested to a user, but not explicitly searched for, are typically referred to as points of interest (POI), which include metadata, such as various business' name, hours of operation, menu, or the like, which are often linked to a specific geocode for a mapping application or through an augmented reality (AR) view. Conventional POI databases, however, have been incomplete except for a few high volume/revenue categories, such as travel, restaurants, medical, and the like. Thus, in the past, the number of complete publishable POI records has been a subset of the total number of points of interest that actually exist. As mentioned above, this trend is changing by a combination of databases expanding coverage and the creation of new POI models. This expansion has created POI congestion in locations, such as multi-tenant facilities, such as office buildings, shopping malls, and the like, where it is often difficult to access or select a desired pin in a dense cluster. Therefore, a different mechanism for representing the POI graphically or a new way for more sophisticatedly filtering the POI for a specific user would be advantageous to minimize clutter and irrelevant search results graphically displayed by a mapping application.

Figure 3A:
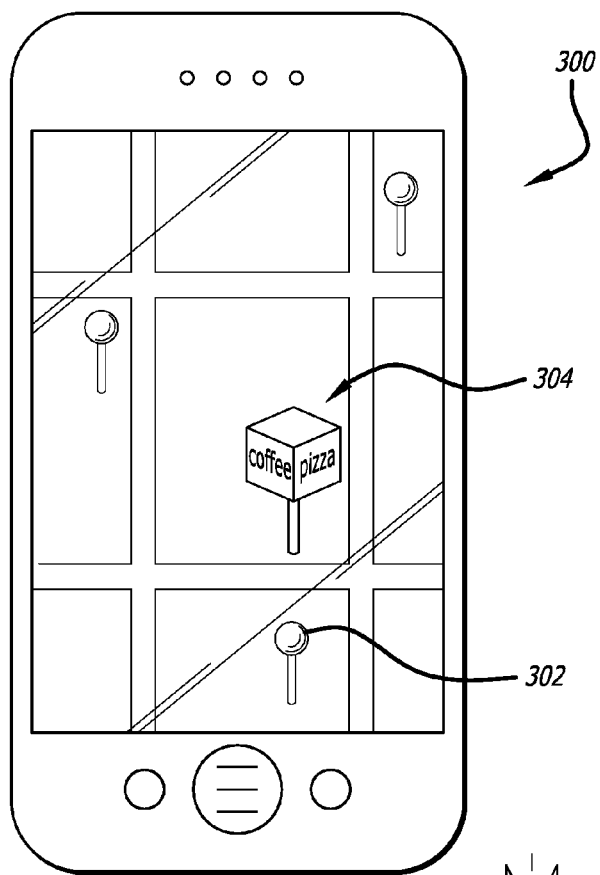
FIGS. 3A-3D illustrate an example graphical approach for providing a mapping application and graphical element for a computing device in accordance with at least one embodiment.
Figure 3B:
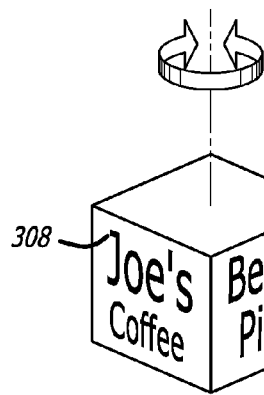
Figure 3D:
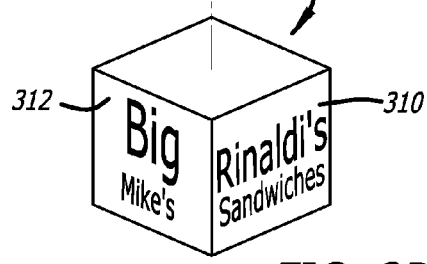
Figure 3C:
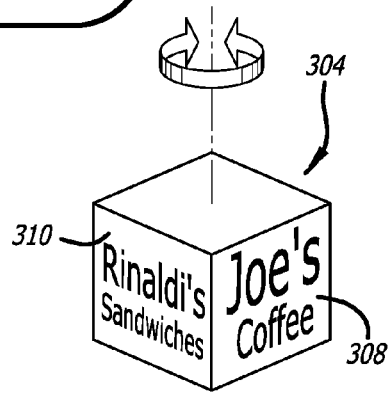

FIGS. 3A-3D illustrate a graphical POI alternative that can be used in accordance with various embodiments. In this example, FIG. 3A illustrates a mapping application 300 that includes one or more pins 302 that represent a geographic location(s) for single individual POI(s) and a multi-dimensional graphical element or icon (also referred to as a polygon icon elsewhere herein) 304 that can simultaneously represent multiple POIs either associated with the same location or multiple POIs clustered relatively close together in a densely populated area. Therefore, in this example, the multi-dimensional icon 304 is represented as a pin with a polygon or tip or head where each surface or side of the polygon represents a different piece of POI (e.g., graphical logos, or pictures), as show in closer detail in FIGS. 3B-3D. In this example, FIG. 3B illustrates two side of the multi-dimensional icon 304. A first side 306 is for the restaurant Beach Pizza and a second side 308 is for Joe's Coffee. In this example, FIG. 3C illustrates the icon 304 rotated slightly where the second side 308 for Joe's Coffee is still showing, but has been rotated to reveal a third side 310 for Rinaldi's Sandwiches. Accordingly, FIG. 3D illustrates the icon 304 rotated to reveal a fourth side 312, for Big Mike's while still angled to reveal the third side 310 for Rinaldi's. In this example, the icon 304 may be rendered in three-dimensions (3D) on a touch display screen, or a quasi-3D model including depth information on a two-dimensional display, of the computing device, in accordance with various embodiments. In at least one embodiment, a user may select the icon 304 to manipulate, rotate, enlarge, and the like, to access the various POI or POI features associated therewith. In one example, a user could touch to select and enlarge the icon 304, and then use one of a number possible finger gestures (e.g., swipe, pinch, splay, etc.) to zoom in or out, rotate the polygon to view various POI associated with that particular location, select a particular POI in order to obtain additional information thereof, and so on. In one embodiment, a window could expand to provide the user with additional information or the information may be provided on the icon 304 itself. Various other approaches and types of information can be utilized or provided as well within the scope of the various embodiments.

In accordance with various embodiments, the multi-dimensional graphical element or icon can take the form of many shapes that are able to visually represent different information in a reasonably efficient manner. The multi-dimensional polygon discussed with respect to FIGS. 3B-3D is just one of many possibilities. For example, the graphical element could include a carrousel view. In this example, when viewed from a low zoom level the user could hold a single finger on the geocoded location, or in an AR viewer that exhibits a 'multi-POI' indicator, to launch a multi-item interface view that expands out to fill out a launched window. The user could then select a volume or specific POI on a virtual shelf, for example, of the carrousel to initiate an in-depth view of the POI, for example.

Figure 4A:
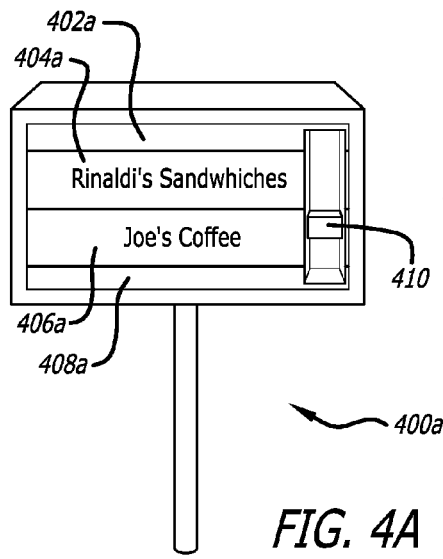
FIGS. 4A-4B illustrate two other example graphical approaches for providing a graphical element in accordance with at least one embodiment.
Figure 4B:
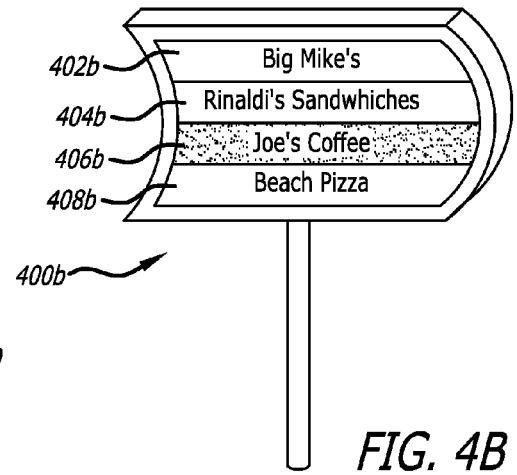

FIGS. 4A-4B illustrate two of a number of possible example graphical POI alternative that can be used in accordance with various embodiments. In this example, FIG. 4A illustrates a graphical element or icon 400a that shows the POIs being accessible or viewable by manipulating a slider 410 and be able drag the same to see all of POIs for that location on the map or while in an AR view. In this example, the icon 400a is shown displaying Rinaldi's Sandwiches 404a and Joe's Coffee 406a while only a portion of Big mike's 402a and Beach Pizza 408a are within view, but accessible by the slider 410. Similarly, in another example, the icon could be a sign, which could be rendered to appear as a miniature billboard including a graphical logo or an image of the POI displayed thereon. The sign could accommodate multiple POIs which could be accessible by swiping horizontally, either to the right or left, to reveal a different POI associated with the location in question. In this example, a small number icon could indicate to a user the number of POI associated with the sign, a miniature versions of each POI logo/image could be displayed concurrently with a main currently displayed POI, or a portion of POIs adjacent a currently displayed POI could all hint at the presence of additional POI. In another example, FIG. 4B illustrates a graphical element or icon 400b that shows the POIs displayed in a list view that simultaneously displays all POIs (402b, 404b, 406b, 408b). Various other approaches and types of graphical elements or icons can be utilized or provided as well with various other functionality and options within the scope of the various embodiments.

Further, a graphical element may also be configured to accommodate scrolling, viewing, or navigating through different POIs of a location in one direction and scrolling, viewing, or navigating through different types of information relating to a particular POI in another direction. In at least one embodiment, a user could scroll vertically through multiple POIs for a location by swiping upward or downward on a touch screen. Upon identifying a POI for which the user desires more information, the user could swipe horizontally to the right or left to view information associated therewith. For example, multiple POIs associated with a location of a multistory building could include Rinaldi's Sandwiches, Joe's Coffee, Big Mike's, and Beach Pizza as discussed with respect to FIGS. 3-4. In this example, a user viewing an image associated with Rinaldi's Sandwiches could scroll or swipe downward to reveal an image associated with Big Mikes and so on to view Joe's Coffee and Beach Pizza. Upon landing on Beach Pizza, for example, the user could then swipe to the right or left once to view a menu, swipe a second time to view Beach Pizza's location on a map, swipe a third time to receive restaurant reviews, and so on. Accordingly, the navigation orientation could also be switched, whereby the user swipes horizontally to view additional POIs and vertically to view additional information of the POI. Various other types of information can be utilized and provided as well within the scope of the various embodiments.

Figure 5A:
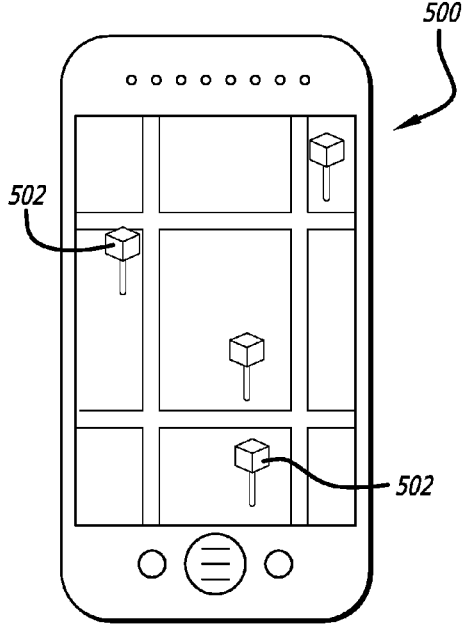
FIGS. 5A-5B illustrate an example graphical approach for providing a mapping application and graphical element for a computing device in accordance with at least one embodiment.
Figure 5B:
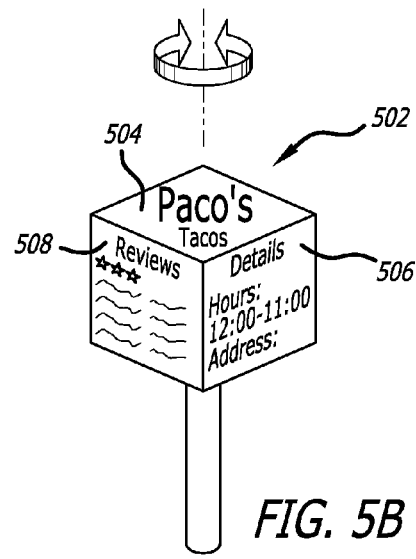

FIGS. 5A-5B illustrate an alternative graphical representation for a single POI for display by a mapping application that can be used in accordance with various embodiments. In at least one embodiment, a multi-dimensional graphical element can identify a location and information for various aspects of a single POI. In this example, FIG. 5A illustrates a mapping application 500 is shown displayed on a computing device including multiple icons or pins 502 each representing the locations of multiple individual POIs. In this example, each pin 502 represents multiple aspects or types of information for a single POI. Similar to the above example, each pin 502 is represented as a multi-dimensional icon or polygon where each surface or side of the polygon can represent a different aspect or piece of information for the single POIs. In this example, each surface can represent one of these different aspects or pieces of information. For example, there could be a surface for customer reviews, a surface for store hours, address, or contact information, a surface for a restaurant's menu, a surface for promotions, and the like. In this example, FIG. 5B illustrates a pin 502 for a single restaurant POI, Paco's Tacos. In this example, the pin 502 is rendered to display the restaurant's name on a top face 504 of the polygon, hours and restaurant details on a first side face 506, and reviews on a second side face 508. Additionally, a menu, coupons, promotions, happy hour menu, and the like can be displayed on other sides of the polygon not shown. In this example, a user could turn the polygon access the different information and select a desired side to view the same. In one embodiment, selecting a side may open a separate window or enlarge a portion of the polygon. Similarly, in another example, the icon could also be a sign, instead of a polygon rendered to appear as a miniature billboard, as discussed above. In this example, the icon may including a graphical logo or an image for the name of the restaurant and the different aspects or types of information could be accessible by swiping horizontally the sign. Other aspects and features discussed elsewhere herein may also apply.

Figure 6:
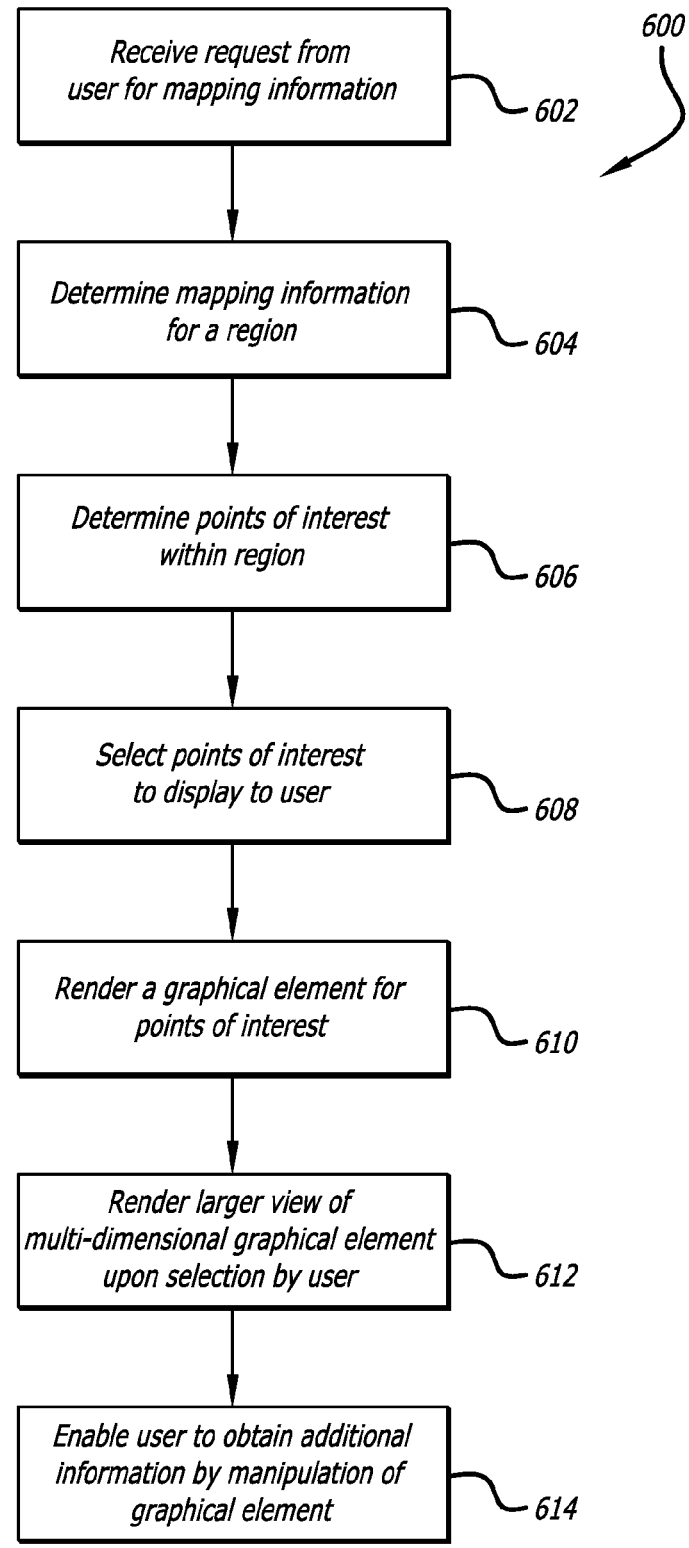
FIG. 6 illustrates an example process for rendering multiple POIs for a location in a single graphical element in accordance with various embodiments.

FIG. 6 illustrates an example process 600 for selecting POI to display to a user that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a request to execute a mapping application is received 602 for a user. The map data to satisfy the request is determined 604, where the map data can include map tiles, road information, driving directions, and similar such information. Based at least in part upon this information, as well as a location associated with the map data for the request, POI information related to the location and user preference information can be determined 606. As discussed herein, user preference information at least includes one or more of user purchase history, user browsing history, user geographic travel patterns, user profile information, explicitly stated user interests, or any other historical usage patterns, input preferences, previous user data selections, and the like. The POI can be ranked using any of a number of ranking, suggestion, and/or recommendation engines in order to assign scores or values indicating how likely each POI is to be of interest to the user. For example, different factors or weights might be applied based on various factors, such as whether a user has explicitly indicated interest in a POI, has expressed interest in related POIs, etc. Further, contextual data associated with a current setting, environment, circumstance, or event around the computing device can be utilized in addition, or as an alternative, to the user preference information to weight and/or prioritize POI for a particular user. As used herein, contextual data can at least include temporal information, such as a time of day or a day of the week; movement information from various sensors, such as an accelerometer, electronic compass, or gyroscope; or location information from various location determining sensors, such as a GPS sensor, or from various location determining techniques utilizing data, such as IP address data, or signal triangulation data. Further, information from an application, such as a calendar application, a task list application, an email application, and the like, can also be used to determine, predict, or anticipate a current or future context associated with the computing device. These factors can be used to generate a relevance or interest score for each item with respect to that user, for example, and the POIs can be sorted or "ranked" according to these scores. At least a portion of the POI can be selected 608, such as a determined number of the top ranking POI, and the selected POI can be provided with the map data for display to the user. A multi-dimensional graphical element, such as a pin, is rendered for the POI information to identify POI for a particular location 610. The multi-dimensional graphical element is selectable and upon selection by the user, a larger view of the multi-dimensional graphical element can be rendered 612, such as display a zoomed in version of the graphical element. The user can engage and manipulate the multi-dimensional graphical element to obtain additional information associated with the POI information for the location 614. Accordingly, the user can subsequently select the additional information to perform a function, such as dial a phone number, navigate to a webpage, open a restaurant review, view a menu, receive directions to a destination, and the like. Further, a number of POI for the location is identified. Based on the number of POI for the location, a number of surfaces or faces of the multi-dimensional element are identified in order to display each of the POI. The number of surfaces can be determined based at least in part on a map parameter, such as a number of POI associated with a location, or a given POI density for a location based on a current zoom level as displayed on the computing device and the like. Various other types of information can be utilized and provided as well within the scope of the various embodiments.

In at least some embodiments, the mapping service can, directly or indirectly, analyze information stored for the user to attempt to determine interests, behavior, or other such information that indicates topics, locations, or subjects that are potentially of interest to the user. In at least some embodiments, the mapping service will monitor interactions of the user with the POI, and can provide feedback to relevant third party providers of the POI regarding whether the user visited, viewed, or otherwise showed interest in any of their POI. The third party provider can then use this information for purposes such as to adjust scores for various POI, or to adjust selection algorithms or other such aspects. The mapping service can also use this information to determine how much to weight POI recommendations from different services in order to help rank the POI from different sources and determine which POI to display. Further, the POI information could also be weighted or filtered based on a current context of the user or explicit user indications. The user's current context can be determined, in various embodiments, using global positioning system (GPS) data, accelerometer data, electronic compass data, gyroscope data, a time of day, or a day of a week. For example, a user walking down a street, as determined by a relatively low ground speed and being located on a side walk, is probably not interested in the location of car parking lots. Therefore, when a user inputs a search for park, either by typing or through a conversational interface, in such a context, car parking lot information will be weighted much lower. Various other approaches and types of information can be utilized in order to determine a user's context as discussed elsewhere herein and as known in the art within the scope of the various embodiments.

In one example, one or more APIs can be exposed to third party POI providers. The third party providers can use this information to provide POI data to be incorporated with mapping data for various users. The data provided can already be in POI format, or can include geocoding or other data necessary to enable the corresponding POI format to be generated for that data. In at least some embodiments, a user device can be enabled to select to receive POI from one or more providers. A user can make such a selection through the mapping application, through an interface with the mapping service, directly with the third party provider, or using another such approach. When a request for mapping data is received from that user, the map data (e.g., graphic tiles, road names, route information, and default POI) for the request can be determined. In at least some embodiments, a user might have the ability to specify to receive certain types of POI from the mapping service provider itself, or the mapping service provider might store information obtained from third party providers. In this example, the mapping service can send a request for POI to one or more POI providers providing a type of POI in which the user has indicated interest. The request can include information such as a user identifier, information about a location or region of the mapping, as well as any criteria for the POI or other such information. One or more responses then can be received with POI data matching the request. The mapping service can then select (directly or using a selection service) at least a portion of the received POI information, and can provide that portion to the client device associated with the user, such that the user can view the POI data. In at least some embodiments, the mapping service will monitor interactions of the user with that POI, and can provide feedback to the relevant third party providers regarding whether the user visited, viewed, or otherwise showed interest in any of the POI. The third party provider can then use this information for purposes such as to adjust scores for various POI, or to adjust selection algorithms or other such aspects. The mapping service can also use this information to determine how much to weight POI recommendations from different services in order to help rank the POI from different sources and determine which POI to display.

In some cases, the user might have an account with a third party provider of POI, which can enable that POI to automatically appear on the mapping information if the mapping service has a relationship with the provider. In some embodiments, the user might have to pay for the third party provider service, or have an account with that provider, in order for that information to appear.

In some embodiments, various providers can offer sets or types of POI available through the mapping application, where the user can subscribe to that type of POI. The user in some embodiments can purchase the set of POI or pay periodically to receive current POI of that type. Such an approach enables third party providers to obtain revenue for providing the POI to the mapping service, enables the mapping service to offer a potentially wide variety of types of POI, and provides the user with the ability to view many different types of POI. The user might subscribe only for a period of time, such as when the user will be in a certain location, or might have a recurring or renewable subscription, among other such options. In some embodiments, the interaction of users with certain types of POI can indicate a current price for different sets of POI, which sets of POI are offered through the marketplace, etc.

Similarly, the APIs exposed by the mapping provider can allow the mapping data to be embedded in applications provided by, or associated with, the third party providers. For example, instead of the user opening a mapping application to view housing data, the user might open the housing data application and receive the familiar mapping information from the mapping service. Such an approach can make the user more comfortable, as the user is using a map with which the user is familiar, and thus can improve the user experience and make the user more likely to use that application.

In some embodiments, users can potentially purchase customized sets of POI from third parties that can be installed on the user's device, uploaded to the cloud, provided to the mapping service for use with the mapping application, etc. In some embodiments, a user might also have the option to generate or customize their own POI. For example, a user can import entries from a contact list or social networking site to have addresses of friends or family members added as POI. The user also can select certain locations as persistent POI, where favorite locations always appear on the map for a certain area and/or certain zoom level, etc. The user can potentially customize the pins or POI markers, such as by applying images or graphics for the POI. Also, the user can potentially customize the message for a given POI. For example, a user might change the name from "Pizza Palace" to "Sausage Stuffed Crust Pizza" or "Mom's favorite place" so the POI message is also more relevant to the user. Various other options can be provided as well.

In some embodiments, a mapping service might also suggest certain subscriptions to a user based on information known about the user. For example, if the user buys a lot of cookbooks or checks into a lot of gourmet restaurants, the mapping service might recommend a subscription to a restaurant-related POI service such that the user can obtain top-rated POI for various locations. Similarly, if the user buys a lot of car parts or books about cars, the mapping service might suggest the user purchase a set of auto-related POI. Some of this data might be obtained from the mapping service data store, but the ability to expand the POI can provide additional locations and/or different information about some of the same locations.

FIGS. 7A and 7B illustrate front and back views, respectively, of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
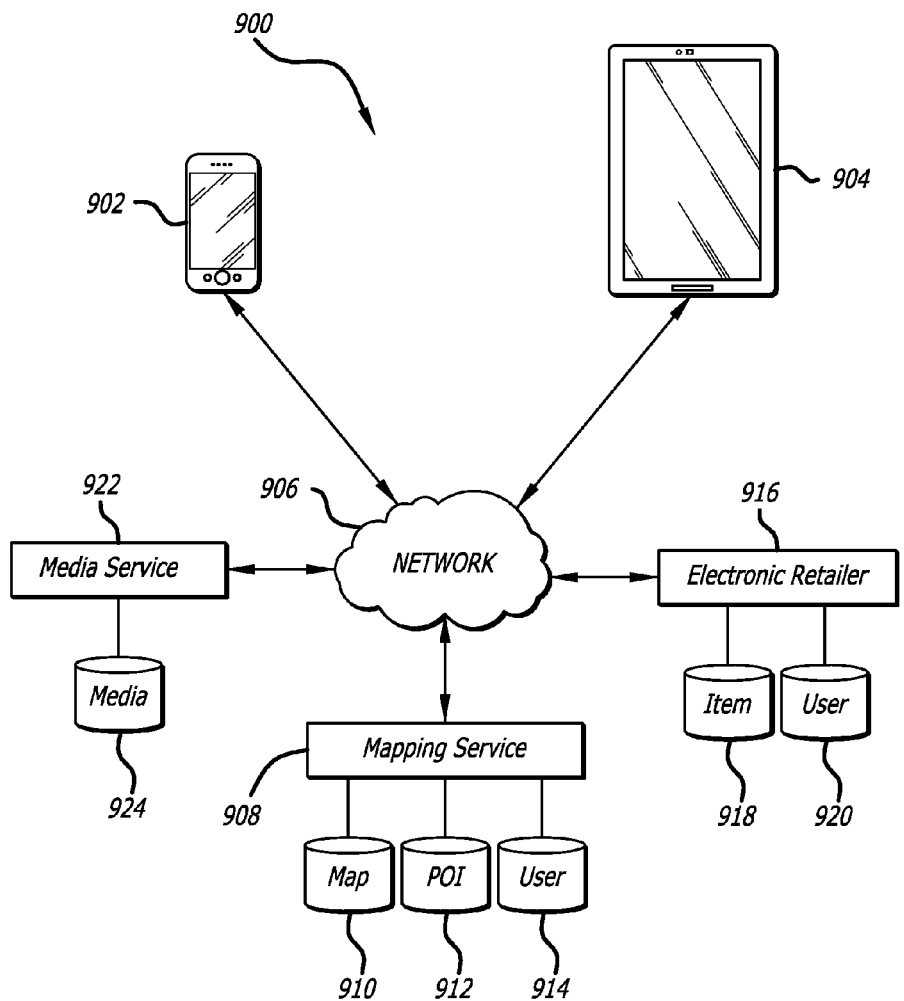
FIG. 9 illustrates an environment in which aspects of the various embodiments can be implemented.

FIG. 9 illustrates an example environment 900 in which a user can obtain mapping information using one or more client devices, such as computing device 700, in accordance with various embodiments. It should be understood that the example system provides a general overview of basic components, and that there can be many additional and/or alternative components utilized as known or used in the art for the generation, transmission, processing, management, and/or storage of electronic information. In this example, a user is able to utilize a client device 902, such as a personal computer, tablet computer, smart phone, and the like, to access a mapping system or service 908 over at least one appropriate network 906, such as a cellular network, the Internet, or another such network for communicating digital information. In some embodiments, a mapping application will be installed on the client device 902, such that much of the planning, information gathering, or other such aspects can be executed on the client device, while the mapping service 908 is contacted primarily to obtain map tiles (e.g., bitmap or vector), point of interest data, and other such information, which the mapping service might pull from a map data store 910, a point of interest (POI) data store, and/or another such location. The determining of routes between two or more locations can be performed on the client device 1002, by the mapping service 908, or a combination thereof. Various other interaction and execution approaches can be utilized as well within the scope of the various embodiments.

A user can use one of the client devices 902, 904 to request, through the mapping application (or a mapping Web site, etc.), specific mapping information. The mapping information can include, for example, graphical map tiles that show a map view of a region around an address, road and area identifying information, and various points of interest that might be displayed on a region of the map being displayed by the application. In many cases, the mapping service 908 will pull the map data from a map data store 910 or other such location, and a portion of a default set of POI stored in a POI data store 912, or other such location. The mapping service might also include a user data store 914 for storing preference, account, or other such information for the user. The mapping service can select the data appropriate for the request, and provide the data back over the at least one network 906 to the client device 902 from which the request originated.

As mentioned, the POI data returned from the mapping service can be selected from a default set of POI determined by a provider of the mapping service, or other such entity. This information can be obtained using conventional approaches, such as by accessing publicly accessible data to obtain information about public locations (e.g., parks and government buildings) or major attractions (ball parks, amusement parks, etc.). The mapping service provider can also provide POI for locations corresponding to businesses or locations with which the mapping service has established a business relationship, whether directly or indirectly. For example, the mapping service might display POI for gas stations or restaurant chains that have paid to be included with the POI data.

Systems and methods in accordance with various embodiments, however, can also enable information from other sources to be included as POIs as well. For example, as illustrated in FIG. 9 the mapping system or service can include at least one Web service layer 926, or other such set of components, which can include one or more APIs 928, or other such interfaces, enabling data from third parties to be used with the mapping service. It should be understood that the Web services layer can include any appropriate components known for receiving and processing Web service requests, as may include Web servers, routers, network infrastructure, and other such components. Further, although an Internet-based service layer is described, it should be understood that other such interface mechanisms can be used as well within the scope of the various embodiments. In this example, one or more third party content providers can use the APIs to inject POI data into the mapping service 1008, such that a mapping application executing on a client device 902, 904 can include additional types of POI that might be of more interest to a user of those devices.

As a first example, one of the content providers is an information service 922 that provides a certain type of information that is stored in at least one information data store 924 or other such location. The information can include, for example, housing data, rental data, information about types of organizations or businesses (e.g., doctors, veterinarians, health clinics), or other location specific information. The information also can include information related to interests of the user, such as locations where movies were filmed, locations mentioned in song lyrics, locations where video games or books allegedly took place, and places where certain types of items can be obtained, among many other such options.

In one example, the mapping service might enable the information service 1022 to provide information such as doctor locations, clinic locations, and the like, which might be automatically added to map data as POIs. In other embodiments, a user might be able to request certain types of POI from one or more providers. For example, if a user is interested in finding an apartment for rent, the user can select an option to have that type of data shown on a map. When the mapping service provides information for the map, the service can also provide rental information or POI obtained from a provider of that type of POI. In some embodiments, the mapping service can determine whether a user has an account with a provider, and if so can have that information automatically added to the map information. For example, if a user has an account with a service that provides housing prices for the user's real estate, that information might automatically be added to the map data. Similarly, if the user has an account with a social network, information from the social network can be obtained and used to provide POI on the maps displayed. These POIs can include, for example, friends' houses, places of work, favorite places to visit, etc. In some cases, the actual location of one or more friends (as may be determined by a location of their phone, for example) might also be displayed as a POI. Various other types of information can be displayed as well.

As another example, an electronic retailer 916, or provider of an electronic marketplace, can provide information about products purchased, viewed, or otherwise obtained by the user. If a user of the mapping service also has an account (or the same account) with an electronic retailer, as might be stored in a user data store 920, the mapping service can contact the electronic retailer for information about the user (assuming the user approves, allows, or enables the transfer of such information). For example, the electronic retailer will typically store information about items (products, services, downloads, etc.), in an item data store 918 or other such location, that the user has obtained, borrowed, viewed, or otherwise expressed interest. There might be a number of locations associated with those items that might be presented as POIs to the user. For example, a user buying a toy car might be interested in locations where the user could view the actual car. A user buying a book might be interested in where the book was written or allegedly took place. A user buying clothes of a particular designer might be interested in locations where a user can purchase clothes from that designer. A user who buys coffee drinks or comics might be interested in locations where a user can purchase those types of items. Various other types of location information related to items can be utilized as well within the scope of the various embodiments. The electronic retailer can determine the relevant data from at least one item data store 918, or other such location, to provide to the mapping service.

In the example situation of FIG. 9, the mapping service can obtain a list or set of information about items associated with the user. This can include a list of specific items in which the user has expressed interest, types of items in which the user has expressed interest, related or recommended items, etc. In some cases, information obtained from the retailer might include data necessary to determine various POI that might be able to be provided to a user when the user views an area through the mapping application that is associated with that POI. In at least some embodiments, information for the items (obtained from the retailer or another source) can be geocoded or otherwise can include location information that can enable that data to be easily ported into, or used by, the mapping service and/or mapping applications. In some cases the mapping service might contact the retailer and/or an information service periodically to obtain such information, while in other embodiments the contact might be made in response to specific actions or events triggered by the user.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
under the control of one or more computer systems configured with executable instructions,
receiving an input from a user of a mapping application executing on a client device;
receiving map information corresponding to a region associated with the received input;
determining point of interest (POI) information associated with the region;
selecting at least a subset of the POI information corresponding to at least a portion of the region, the subset including at least a first set of POI information for a first POI and a second set of POI information for a second POI;
rendering a map and a first view of a multi-dimensional graphical element, the first view of the multi-dimensional graphical element representing the first set of POI information for the first POI that is associated with a location on the map corresponding to the region associated with the received input; and
based at least in part on a user interaction with the first view of the multi-dimensional graphical element, rendering a second view of the multi-dimensional graphical element, the second view showing the second set of POI information for the second POI that is associated with the location on the map.

2. The computer-implemented method of claim 1, wherein the location is associated with multiple POI and the multi-dimensional graphical element is a pin comprising a head having a plurality of surfaces, wherein a surface of the head corresponds to a POI associated with the location.

3. The computer-implemented method of claim 2, wherein the user interaction with the multi-dimensional graphical element includes at least one of an input to scroll, rotate, or slide at least one surface of the multi-dimensional graphical element.

4. The computer-implemented method of claim 1, further comprising:
detecting user interaction with at least one of the mapping application or the multi-dimensional graphical element; and
updating at least a portion of the user preference information based at least in part on the detected user interaction.

5. A computer-implemented method, comprising:
under the control of one or more computer systems configured with executable instructions,
causing a map to be displayed on a display of a computing device;
rendering a first view of a polygonal icon for a location on the map, the polygonal icon comprising a plurality of surfaces, wherein each surface of the polygonal icon corresponding to a different type of data associated with the location, wherein the first view shows a first type of data associated with the location;
detecting a user interaction with at least a portion of the first view of the polygonal icon; and
based at least in part on the user interaction with the first view of the polygonal icon, rendering a second view of the polygonal icon, wherein the second view of the polygonal icon shows a second type of data associated with the location.

6. The computer-implemented method of claim 5, wherein the user interaction includes at least one of an input to scroll, rotate, or slide at least one surface of the polygon icon.

7. The computer-implemented method of claim 5, wherein each different type of data corresponds to a different point of interest (POI).

8. The computer-implemented method of claim 7, further comprising:
determining a zoom level of the map; and
identifying, based at least in part on the zoom level, one or more point of interest (POI) located within a predetermined distance on the map,
wherein a number of surfaces of the polygonal icon is based, at least in part, on a number of identified one or more POI within the predetermined distance.

9. The computer-implemented method of claim 8, wherein each of the one or more POI is determined based at least in part on contextual data, the contextual data including location information associated with the computing device from at least one of global positioning system (GPS) data, an IP address, or signal triangulation data.

10. The computer-implemented method of claim 9, wherein the contextual data includes position information derived, at least in part, from at least one of an accelerometer, an electronic compass, or a gyroscope of the computing device.

11. The computer-implemented method of claim 9, wherein the contextual data includes at least one of a day of a week or a time of day.

12. The computer-implemented method of claim 5, wherein each different type of data corresponds to a different type of information associated with a single POI.

13. The computer-implemented method of claim 12, wherein the different type of information includes at least one of a phone number, a link to a web address, customer review information, a menu, or directions for the single POI.

14. The computer-implemented method of claim 5, wherein the polygonal icon is a pin on the map with a multi-dimensional head, wherein a surface of the polygon icon corresponds to a point of interest (POI) associated with the location.

15. The computer-implemented method of claim 14, further comprising:
based at least in part on user interaction with the display of the pin, presenting additional information associated with the POI for the location.

16. A computing device, comprising:
a processor;
a display screen; and
memory including instructions that, when executed by the processor, cause the computing device to:
cause a map for a location to be displayed on the display screen;
based at least in part upon user preference information, determine point of interest (POI) information corresponding to a current view of the map;
render a first view of a polygonal icon for the determined POI information associated with the location, each surface of the polygonal icon corresponding to a different type of POI information associated with the location, wherein the first view of the polygonal icon shows a first type of data associated with the location;
detect an input from a user with the first view of the polygonal icon; and
based at least in part on the input with the first view of the polygonal icon, render a second view of the polygonal icon, wherein the second view of the polygonal icon shows a second type of data associated with the location.

17. The computing device of claim 16, wherein the input includes at least one of an input to scroll, rotate, or slide at least one surface of the polygon icon.

18. The computing device of claim 16, wherein the user preference information is determined based at least in part on contextual data including at least one of movement data, a day of a week, or a time of day.

19. The computing device of claim 16, wherein the instructions, when executed by the processor, further enable the computing device to:
- monitor behavior of the user with respect to at least one of mapping data or the POI information; and
- based at least in part on the monitored behavior, determine at least a portion of the user preference information.

20. The computing device of claim 16, further comprising:
- determine a zoom level of the map; and
- identify, based at least in part on the zoom level, one or more POI located within a predetermined distance on the map, wherein a number of surfaces of the polygonal icon is based, at least in part, on a number of identified one or more POI.

21. A non-transitory computer-readable storage medium storing instructions that, when executed by a processor of a computing device, cause the computing device to:
- cause a map for a location to be displayed on a display of the computing device;
- render a first view of a polygonal icon for point of interest (POI) information associated with the location on the map, each surface of the polygonal icon corresponding to a different type of POI information, wherein the first view of the polygonal icon shows a first type of data associated with the location;
- detect an input provided to the first view of the polygonal icon from a user; and
- based at least in part on the input to the first view of the polygonal icon, render a second view of the polygonal icon, wherein the second view of the polygonal icon shows a second type of data associated with the location.

22. The non-transitory computer-readable storage medium of claim 21, wherein the location is associated with multiple POI and the polygonal icon is a pin on the map with a multi-dimensional head, each different type of POI information corresponding to a different POI associated with the location.

23. The non-transitory computer-readable storage medium of claim 21, wherein the location is associated with a single POI and the polygonal icon is a pin on the map with a multi-dimensional head, each different type of POI information corresponding to a different type of information for the single POI associated with the location.

24. The non-transitory computer-readable storage medium of claim 21, wherein the instructions that, when executed by the processor of the computing device, further cause the computing device to:
- filter the POI information based at least in part upon at least one of a current context of the user, a past behavior of the user, or explicit user indications.

25. The non-transitory computer-readable storage medium of claim 21, further comprising:
- receive a selection to the second view to at least one of dial a phone number, navigate to a webpage, open a review, view a menu, or receive directions to a destination.

* * * * *